United States Patent
Qian et al.

(10) Patent No.: US 11,577,400 B2
(45) Date of Patent: Feb. 14, 2023

(54) METHOD AND APPARATUS FOR MANAGING ROBOT SYSTEM

(71) Applicant: ABB Schweiz AG, Baden (CH)

(72) Inventors: Changnian Qian, Shanghai (CN); Yanjun Wang, Shanghai (CN); Bojun Ma, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 165 days.

(21) Appl. No.: 17/034,162

(22) Filed: Sep. 28, 2020

(65) Prior Publication Data

US 2021/0008724 A1 Jan. 14, 2021

Related U.S. Application Data (63) Continuation of application No. PCT/CN2018/103821, filed on Sep. 3, 2018.

(51) Int. Cl.
*B25J 9/16* (2006.01)
*B25J 9/10* (2006.01)
*B25J 13/08* (2006.01)

(52) U.S. Cl.
CPC ........... *B25J 9/1697* (2013.01); *B25J 9/106* (2013.01); *B25J 9/161* (2013.01); *B25J 9/1664* (2013.01); *B25J 9/1692* (2013.01); *B25J 13/089* (2013.01)

(58) Field of Classification Search
CPC . B25J 9/1697; B25J 9/106; B25J 9/161; B25J 9/1664; B25J 9/1692; B25J 13/089;

(Continued)

(56) References Cited

U.S. PATENT DOCUMENTS 4,305,130 A * 12/1981 Kelley ............... G06T 1/0014
  901/17
5,319,443 A * 6/1994 Watanabe ............ G01S 5/16
  356/614

(Continued)

FOREIGN PATENT DOCUMENTS

CA 2977077 A1 11/2017
CN 103170973 A 6/2013

(Continued)

OTHER PUBLICATIONS

Intellectual Property Office of the P.R. China, International Search Report & Written Opinion issued in corresponding Application No. PCT/CN2018/103821, dated Jun. 3, 2019, 9 pp.

(Continued)

*Primary Examiner* — Jaime Figueroa
(74) *Attorney, Agent, or Firm* — Greenberg Traurig, LLP (57) ABSTRACT

Embodiments of the present disclosure provide methods for managing a robot system. In one method, orientations for links in the robot system may be obtained when the links are arranged in at least one posture, here each of the orientations indicates a direction pointed by one of the links. At least one image of an object placed in the robot system may be obtained from a vision device equipped on one of the links. Based on the orientations and the at least one image, a first mapping may be determined between a vision coordinate system of the vision device and a link coordination system of the link. Further, embodiments of present disclosure provide apparatuses, systems, and computer readable media for managing a robot system. The vision device may be calibrated by the first mapping and may be used to manage operations of the robot system.

18 Claims, 4 Drawing Sheets

(58) Field of Classification Search
CPC ........... G05B 2219/39024; G05B 2219/39045; G05B 2219/39057
USPC ................. 700/245–264; 318/568.11–568.25
See application file for complete search history.

(56) References Cited

U.S. PATENT DOCUMENTS

| | | | | |
|---|---|---|---|---|
| 5,525,883 | A * | 6/1996 | Avitzour | G05D 1/0234 318/587 |
| 5,978,080 | A * | 11/1999 | Michael | G01B 11/002 356/243.1 |
| 5,978,521 | A * | 11/1999 | Wallack | G01B 11/275 382/294 |
| 6,681,151 | B1 * | 1/2004 | Weinzimmer | B25J 9/1697 356/243.1 |
| 6,798,925 | B1 * | 9/2004 | Wagman | G06T 7/80 382/287 |
| 7,200,260 | B1 * | 4/2007 | Watanabe | B25J 9/1692 901/3 |
| 8,717,421 | B2 * | 5/2014 | Peters, II | G06T 7/85 348/47 |
| 9,075,411 | B2 * | 7/2015 | Aiso | B25J 9/1692 |
| 9,734,419 | B1 * | 8/2017 | Ye | G06T 7/85 |
| 10,076,842 | B2 * | 9/2018 | Liu | G06T 7/80 |
| 10,525,597 | B2 * | 1/2020 | Harada | B25J 9/1697 |
| 10,565,737 | B1 * | 2/2020 | Islam | G06T 7/75 |
| 10,664,994 | B2 * | 5/2020 | Liu | H04N 17/002 |
| 10,780,585 | B2 * | 9/2020 | Park | B25J 9/1692 |
| 10,871,366 | B2 * | 12/2020 | Nahum | B25J 9/1666 |
| 10,967,517 | B2 * | 4/2021 | Kobayashi | G06T 7/80 |
| 2004/0211883 | A1 * | 10/2004 | Imagawa | G01S 11/14 250/221 |
| 2005/0166413 | A1 * | 8/2005 | Crampton | G01B 5/008 33/503 |
| 2005/0225278 | A1 * | 10/2005 | Ban | B25J 9/1692 318/568.11 |
| 2005/0237385 | A1 * | 10/2005 | Kosaka | G01B 11/00 348/42 |
| 2005/0256395 | A1 | 11/2005 | Anabuki et al. | |
| 2006/0088203 | A1 * | 4/2006 | Boca | G06T 7/75 382/153 |
| 2008/0216552 | A1 * | 9/2008 | Ibach | G01B 5/0025 73/1.01 |
| 2009/0096790 | A1 | 4/2009 | Wiedemann et al. | |
| 2009/0234502 | A1 * | 9/2009 | Ueyama | B25J 9/1697 700/259 |
| 2009/0252423 | A1 * | 10/2009 | Zhu | G06V 40/103 382/209 |
| 2011/0015649 | A1 * | 1/2011 | Anvari | A61B 34/20 606/130 |
| 2011/0280472 | A1 * | 11/2011 | Wallack | G06T 7/80 901/14 |
| 2012/0259462 | A1 * | 10/2012 | Aoba | B25J 9/1697 901/46 |
| 2013/0010081 | A1 * | 1/2013 | Tenney | H04N 13/20 348/47 |
| 2013/0274921 | A1 * | 10/2013 | Aiso | G05D 3/00 700/251 |
| 2014/0229005 | A1 * | 8/2014 | Suzuki | B25J 9/1692 700/254 |
| 2014/0240520 | A1 * | 8/2014 | Liu | H04N 5/232 348/187 |
| 2014/0347079 | A1 * | 11/2014 | Min | G01R 31/001 324/750.01 |
| 2015/0085979 | A1 * | 3/2015 | Zheng | A61B 6/0492 378/207 |
| 2016/0184995 | A1 * | 6/2016 | Uchiyama | H04N 5/23293 700/259 |
| 2016/0221189 | A1 * | 8/2016 | Nilsson | B25J 9/1653 |
| 2017/0151671 | A1 * | 6/2017 | Ishige | G06V 10/75 |
| 2018/0024521 | A1 * | 1/2018 | Matsuura | B25J 9/1692 700/83 |
| 2018/0079090 | A1 * | 3/2018 | Koenig | G16H 40/63 |
| 2018/0147726 | A1 * | 5/2018 | Kobayashi | B25J 9/1697 |
| 2018/0161984 | A1 * | 6/2018 | Ishige | B25J 9/1697 |
| 2018/0194008 | A1 * | 7/2018 | Namiki | G06T 7/80 |
| 2018/0289575 | A1 * | 10/2018 | Hiratsuka | A61G 13/101 |
| 2018/0361589 | A1 | 12/2018 | Paquin et al. | |
| 2019/0374417 | A1 * | 12/2019 | Hiratsuka | A61G 13/06 |
| 2020/0002104 | A1 * | 1/2020 | Bussiere | H01L 21/67196 |
| 2020/0056878 | A1 * | 2/2020 | Nahum | B25J 19/023 |
| 2020/0380727 | A1 * | 12/2020 | Tian | G08G 5/04 |

FOREIGN PATENT DOCUMENTS

| | | |
|---|---|---|
| CN | 105205824 A | 12/2015 |
| CN | 105716527 A | 6/2016 |
| CN | 106323294 A | 1/2017 |
| EP | 1512499 A2 | 3/2005 |
| EP | 2767370 A2 | 8/2014 |

OTHER PUBLICATIONS

Extended European Search Report, issued by the European Patent Office, regarding corresponding patent application Serial No. EP18932568.1; dated Oct. 25, 2021; 11 pages.

Nickelsen, J.; "Vision Assisted Light Assembly Robot System Orientation"; Institute of Electrical and Electronics Engineers: International Electronic Manufacturing Technology Symposium—"Manufacturing Technology—The Competitive Advantage"; Oct. 12-14, 1987; pp. 53-60; USA.

Bruno Siciliano, et al.; "Visual Servoing" In: "Robotics: modelling, planning and control"; Dec. 31, 2009; pp. 409-467. United Kingdom.

* cited by examiner

METHOD AND APPARATUS FOR MANAGING ROBOT SYSTEM

FIELD

Example embodiments of the present disclosure generally relate to a robot system, and more specifically, to methods, apparatuses, systems and computer readable media for managing a robot system equipped with a vision device.

BACKGROUND

With the development of computer and automatic control, robot systems have been widely used to process various types of objects in the manufacturing industry. Typically, a robot system may have a plurality of mechanical arms (also referred to as links), each of which may move within a respective predetermined range. In order to enable the robot system to perform operations on the object (such as grabbing the object, measuring the size of the object, cut the object to a predetermined shape, etc.), vision devices such as cameras may be deployed to take images of the object to facilitate operations of the arms.

There have been proposed several solutions for deploying a camera and assisting robot system's operation. However, conventionally the camera can be only operated at some specific positions where the camera has been calibrated. Therefore, it is desired to manage the robot system with a camera in a more effective and convenient manner.

SUMMARY

Example embodiments of the present disclosure provide solutions for controlling a robot system.

In a first aspect, example embodiments of the present disclosure provide a method for managing a robot system. The method may comprise: obtaining orientations for links in the robot system when the links are arranged in at least one posture, each of the orientations indicating a direction pointed by one of the links; obtaining, from a vision device equipped on one of the links, at least one image of an object placed in the robot system; and determining, based on the orientations and the at least one image, a first mapping between a vision coordinate system of the vision device and a link coordination system of the link. With these embodiments, the position and orientation of the vision device is not limited to a fixed position any more. Instead, the vision device may be amounted to any position in the robot system (for example, on any of the arms in the robot system). Further, it is only required to perform the method of the present invention once before normal operations of the robot system. Once the vision device is calibrated according to the present disclosure, it may be used to take images when the arm is moved to any position during the operations of the robot system.

In some embodiments, determining the first mapping comprising: determining, based on the orientations, a second mapping between the link coordinate system and a world coordinate system of the robot system; determining, based on the at least one image, a third mapping between the vision coordinate system and the world coordinate system; and determining the first mapping based on a transformation relationship between the first, second and third mappings. Compared with determination of the first mapping, the second and the third mappings are relatively easily to be determined. With these embodiments, an effective conversion method is provided for determining the first mapping between the vision coordinate system of the vision device and the link coordination system of the link.

In some embodiments, determining the second mapping comprises: determining the second mapping based on the orientations and positions of the links. As the orientations and positions of the links are easily to be measured, these embodiments provide a convenient and effective manner for determining the second mapping between the link coordinate system and the world coordinate system of the robot system.

In some embodiments, determining the third mapping comprises: obtaining a first measurement and a second measurement for a first point and a second point in an image of the at least one image respectively, the first and second points located in a first axis of the vision coordinate system; obtaining a third measurement of a third point in the image, the third point located in a second axis of the vision coordinate system; and determining the third mapping based on the obtained first, second and third measurements. With these embodiments, three points may be selected from the image taken by the vision device. As the coordinates of the three points in the vision coordinate system may be measured from the image, and the coordinates of the three points in the world coordinate system may be read from the robot system, the third mapping may be determined in an automatic manner without manual intervention.

In some embodiments, the method further comprises calibrating the vision device with a calibration board of the vision device before the obtaining the at least one image. With these embodiments, the vision device may be calibrated with the calibration board, therefore the further processing in the present disclosure may be performed on an accurate base. Moreover, the subsequent for determining the mappings between various coordinate systems and for controlling the robot system may be implemented in a precious way.

In some embodiments, obtaining the orientations for the links comprises: obtaining a first group of orientations for the links when the group of links are arranged in a first posture; and obtaining a second group of orientations for the links when the group of links are arranged in a second posture; and obtaining the at least one image of the object comprises: obtaining a first image when the links are arranged in the first posture, and obtaining a second image when the links are arranged in the second posture. Beside the above method for determining the first mapping, these embodiments provide a further method for determining the first mapping by placing the links of the robot system into a first posture and a second posture. By collecting the orientations and the images associated with the first posture and the second posture, respectively, the first mapping may be determined in an automatic manner without any manual intervention.

In some embodiments, determining the first mapping comprises: constructing a transformation relationship between the first mapping, the first and second groups of orientations and the first and second images, the first mapping being an unknown variable in the transformation relationship; and solving the transformation relationship so as to determine the first mapping. With these embodiments, the first mapping may be determined by solving the transformation relationship which is constructed based on the measurements collected in the robot system in real time. Here, the collected measurements may correctly reflect the association between the various coordinate systems, therefore the first mapping may be determined in an accurate and automatic manner without manual intervention.

In some embodiments, the method further comprises: obtaining, from the vision device, an image of a target object to be processed by the robot system; determining a source coordinate of the target object in the obtained image, the source coordinate represented in the vision coordinate system; determining a destination coordinate of the target object based on the source coordinate and the first mappings, the destination coordinate represented in the world coordinate system; and processing the target object based on the destination coordinate. With these embodiments, a shape of the target object may be easily converted between the vision coordinate system which is taken by the vision device and the world coordinate system which is taken by a controller of the robot system during the subsequent operation of the robot system. Further, coordinates of the controller and the target object may be converted into a uniformed one and thus the robot system may be assisted to perform any desired operation.

In a second aspect, example embodiments of the present disclosure provide an apparatus for managing a robot system. The apparatus comprises: an orientation obtaining unit configured to obtain orientations for links in the robot system when the links are arranged in at least one posture, each of the orientations indicating a direction pointed by one of the links; an image obtaining unit configured to obtain, from a vision device equipped on one of the links, at least one image of an object placed in the robot system; and a determining unit configured to determine, based on the orientations and the at least one image, a first mapping between a vision coordinate system of the vision device and a link coordination system of the link.

In some embodiments, the determining unit comprises: a second mapping determining unit configured to determine, based on the orientations, a second mapping between the link coordinate system and a world coordinate system of the robot system; a third mapping determining unit configured to determine, based on the at least one image, a third mapping between the vision coordinate system and the world coordinate system; and a first mapping determining unit configured to determine the first mapping based on a transformation relationship between the first, second and third mappings.

In some embodiments, the second mapping determining unit is further configured to: determine the second mapping based on the orientations and positions of the links.

In some embodiments, the third determining unit comprises: a measurement obtaining unit configured to: obtain a first measurement and a second measurement for a first point and a second point in an image of the at least one image respectively, the first and second points located in a first axis of the vision coordinate system; obtain a third measurement of a third point in the image, the third point located in a second axis of the vision coordinate system; and a mapping determining unit configured to determine the third mapping based on the obtained first, second and third measurements.

In some embodiments, the apparatus further comprises a calibrating unit configured to calibrate the vision device with a calibration board of the vision device before the obtaining the at least one image.

In some embodiments, the orientation obtaining unit is further configured to: obtain a first group of orientations for the links when the group of links are arranged in a first posture; and obtain a second group of orientations for the links when the group of links are arranged in a second posture; and the image obtaining unit is further configured to: obtain a first image when the links are arranged in the first posture, and obtain a second image when the links are arranged in the second posture.

In some embodiments, the determining unit comprises: a constructing unit configured to construct a transformation relationship between the first mapping, the first and second groups of orientations and the first and second images, the first mapping being an unknown variable in the transformation relationship; and a solving unit configured to solve the transformation relationship so as to determine the first mapping.

In some embodiments, the image obtaining unit further configured to obtain, from the vision device, an image of a target object to be processed by the robot system.

In some embodiments, the apparatus further comprises: a source determining unit configured to determine a source coordinate of the target object in the obtained image, the source coordinate represented in the vision coordinate system; a destination determining unit configured to determine a destination coordinate of the target object based on the source coordinate and the first mappings, the destination coordinate represented in the world coordinate system; and a processing unit configured to process the target object based on the destination coordinate.

In a third aspect, example embodiments of the present disclosure provide a system for managing a robot system. The system comprises: a computer processor coupled to a computer-readable memory unit, the memory unit comprising instructions that when executed by the computer processor implements the method for managing a robot system.

In a fourth aspect, example embodiments of the present disclosure provide a computer readable medium having instructions stored thereon, the instructions, when executed on at least one processor, cause the at least one processor to perform the method for managing a robot system.

DESCRIPTION OF DRAWINGS

Throughout the drawings, the same or similar reference symbols are used to indicate the same or similar elements.

DETAILED DESCRIPTION OF EMBODIMENTS

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

1. Environment

Figure 1:
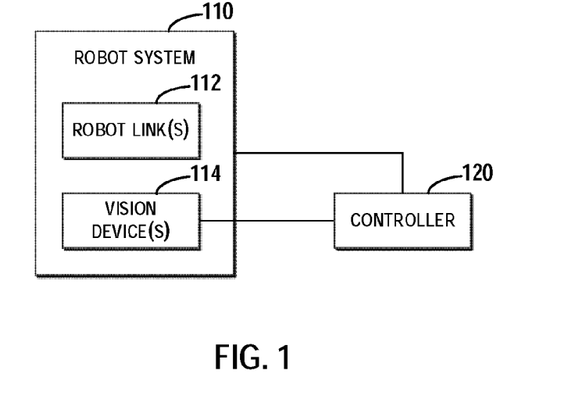
FIG. 1 illustrates a schematic diagram for managing a robot system comprising robot link(s) and vision device(s)

For the sake of description, reference will be made to FIG. 1 to provide a general description of environment in which embodiments of the present disclosure can be implemented. FIG. 1 illustrates a schematic diagram 100 for managing a robot system 110 comprising robot link(s) 112 and vision device(s) 114. In FIG. 1, the robot system 110 may comprise one or more links 112. Here, the link 112 may refer to a mechanical arm in the robot system 110 for processing an object such as a workpiece that is to be manufactured by the robot system 110. The end of the link 112 may be connected to a tool such as a drill for drilling a hole in the object. In order to assistant a controller 120 for the robot system 110, one or more vision devices 114 may be deployed at the link 112. Examples of the vision devices include, but are not limited to, a photo camera, a video camera, and the like. In aid of images taken by the vision device 114, the controller 120 may control the robot system 110 to implement instructions including interactive with the object.

Figure 2:
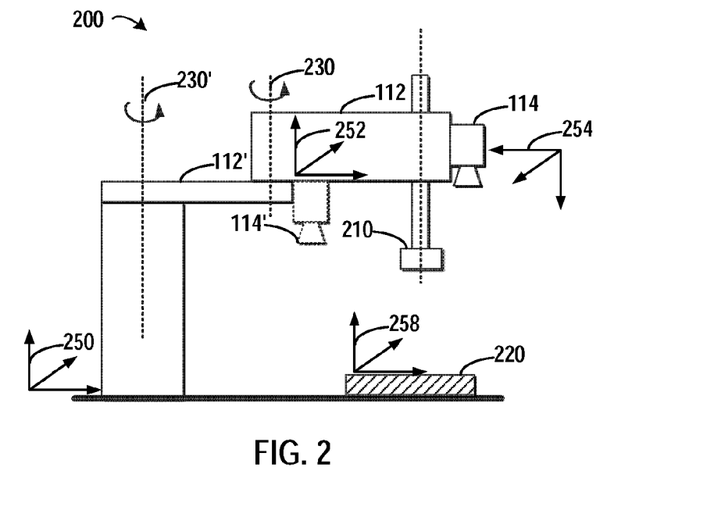
FIG. 2 illustrates a schematic diagram for a robot system in which embodiments of the present disclosure may be implemented.

FIG. 2 illustrates a schematic diagram 200 for the robot system 110 in which embodiments of the present disclosure may be implemented. In FIG. 2, the robot system 110 may comprise a link 112 and a link 112', where the link 112' is connected to a base of the robot system 110, and the link 112 is connected to the link 112'. As shown, the link 112' may rotate around an axis 230' in the base of the robot system 110, and the link 112 may rotate around an axis 230 in the link 112'. Further, a vision device 114' may be equipped at the link 112', and a vision device 114 may be equipped at the link 112. As shown, a tool 210 may be connected to the end of the link 112 for manufacturing an object 220.

In the system as shown in FIG. 2, there may be various coordinate systems for various portions associated with the robot system 110. For example, a world coordinate system 250 may be defined for the robot system 110, a link coordinate system 252 may be defined for the link 112, a vision coordinate system 254 may be defined for the vision device 114, and an object coordinate system 258 may be defined for the object 220. Although only two links 112' and 112 are shown in FIG. 2, more or less links may be equipped in the robot system 110.

There have been proposed solutions for manage a robot system equipped with a vision device. According to one solution, a camera may be deployed at a fixed position associated with the robot system. For example, the camera may be arranged at a fixed base. However, a field of view of the camera is limited by the position of the base and the orientation of the camera, and thus images taken by the camera cannot trace movements of the arms of the robot system.

In another solution, the camera may be mounted to the arm of the robot system. However, this technical solution needs to calibrate the camera at a predetermined position at an initial stage of the robot system. The camera is allowed to take images only when the arm is at the predetermined position during the operation. At this time, although the camera is fixed at the arm, the camera can only operate normally when the arm is in the predetermined position, and the field of view of the camera is still limited to the predetermined position and cannot trace movements of the arm.

2. General Principles

In order to at least partially solve the above and other potential problems, a new method for managing a robot system equipped with a vision device is disclosed according to embodiments of the present disclosure. In general, according to embodiments of the present disclosure, orientations for links in the robot system 110 when the links 112 are arranged in at least one posture are obtained. Each of these orientations indicates a direction pointed by one of the links. Additionally, at least one image of an object 220 placed in the robot system 110 is obtained from a vision device 114 equipped on one of the links 112. Based on the orientations and the at least one image, a first mapping between a vision coordinate system 254 of the vision device 114 and a link coordination system 252 of the link 112 can be determined.

In this way, the position and orientation of the vision device 114 is not limited to a fixed position. Instead, the vision device 114 may be arranged at any position in the robot system 110 (for example, on any of the arms in the robot system 110). Further, it is only required to perform the method of the present invention once before normal operations of the robot system. Once the vision device 114 is calibrated according to the first mapping in the embodiments of the method, the vision device 114 may be used to take images when the arm is moved to any position during the operations of the robot system 110. Therefore, the vision device 114 may move along with the link 112 and trace movements of the link 112.

3. Example Process

Figure 3:
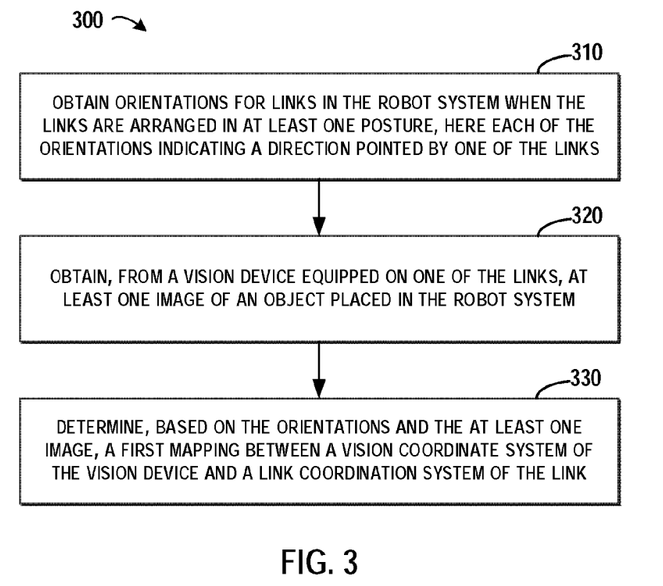
FIG. 3 illustrates a flowchart of a method for managing a robot system in accordance with embodiments of the present disclosure.

Details of the present invention will be provided with reference to FIG. 3, which illustrates a flowchart of a method 300 for managing the robot system 110 in accordance with embodiments of the present disclosure.

At block 310, orientations for links 112 in the robot system 110 may be obtained when the links 112 are arranged in at least one posture. Each of the orientations may indicate a direction pointed by one of the links 112. For example, in FIG. 2, the links 112 and 112' may be arranged in one or more postures. For each posture, an orientation of the link 112 and an orientation of the link 112' may be obtained. In some embodiments, the orientation may be represented by three degrees such as ($\alpha$, $\beta$, $\gamma$) indicates the pitch, yaw and roll angle of the orientation.

Although only two links are depicted in the robot system 110, this is merely for illustration without suggesting any limitations as to the scope of the present disclosure. In other embodiments of the present disclosure, more links may be deployed in the robot system 110. Generally, if there are N links where N is a natural number, then N orientations may be obtained at block 310. At this point, the obtained orientations may be represented by an array of orientations, where the $i^{th}$ element in the array may indicate the $i^{th}$ orientation associated with the $i^{th}$ link.

At block 320, at least one image of the object 220 placed in the robot system 110 may be obtained from the vision device 114 equipped on one of the links 112. Here, the object 220 may be placed within an area reachable by the link 112 in the robot system 110. In some embodiments, the object 220 may be a calibration board which can be used for calibrating the vision device 114.

At block 330, based on the orientations and the at least one image, a mapping (referred to as "first mapping") between the vision coordinate system 254 of the vision device 114 and the link coordination system 252 of the link 112 is determined.

In some embodiments, the first mapping may be represented by a transformation between the coordinate systems 252 and 254. For example, a transformation matrix $T_{vision}^{linkN}$ may be used to represent the first mapping. With the first mapping $T_{vision}^{linkN}$, points in the object 220 which are captured by the vision device 114 in the vision coordinate system 254 can be transformed from the vision coordinate system 254 into the world coordinate system 250.

4. Determination of First Mapping

In various embodiments, the first mapping $T_{vision}^{linkN}$ can be determined in a variety of manners. In some embodiments, the first mapping may be determined from one group of orientations and one image. Alternatively, in other embodiments, the first mapping may be determined from two groups of orientations and two images. Details of these two kinds of way for determining the first mapping will now be discussed.

4.1. Example Implementation I

In some embodiments, for example, in order to determine the first mapping, the links 112 may be arranged in a first posture. At this point, the orientations of the links 112 the image of the object 220 may be obtained according to the above blocks 310 and 320 respectively, and then the obtained orientations and image may be used to determine the first mapping. In these embodiments, based on the orientations obtained at the block 310, a mapping (referred to as "second mapping" and represented by a transformation matrix $T_{linkN}^{world}$,) between the link coordinate system 252 and the world coordinate system 250 of the robot system 110 may be determined. The second mapping can be used to transform coordinates from the link coordinate system 252 into the world coordinate system 250. Then, based on the image obtained at block 320, a mapping (referred to "third mapping" and represented by a transformation matrix $T_{vision}^{world}$ between the vision coordinate system 254 and the world coordinate system 250 may be determined. The third mapping can be used to transform coordinates from the vision coordinate system 254 into the world coordinate system 250.

According to a geometry relationship in various portions of the robot system 110, the first mapping can be determined based on the second and third mappings as below:

$$T_{vision}^{world} = T_{linkN}^{world} * T_{vision}^{linkN} \qquad (1)$$

Compared with a difficulty for determining the first mapping, the second and the third mappings are relatively easily to be determined. With these embodiments, an effective conversion method is provided for determining the first mapping between the vision coordinate system 254 of the vision device 114 and the link coordination system 252 of the link 112.

In some embodiments, the second mapping may be determined based on the orientations and positions of the links 112. As the orientations and positions of the links 112 are easily to obtain, these embodiments provide a convenient and effective manner for determining the second mapping between the link coordinate system 252 and the world coordinate system 250. Now example embodiments for determining the second mapping $T_{linkN}^{world}$ will be described with reference to FIG. 4.

Figure 4:
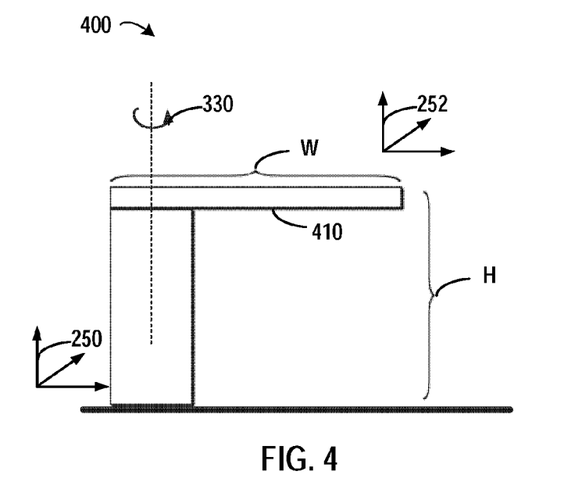
FIG. 4 illustrates a schematic diagram for determining a mapping between a link coordinate system and a world coordinate system in accordance with embodiments of the present disclosure.

In FIG. 4, only one link 410 is shown in the robot system 110 for simplicity. It will be easily appreciated how to determine the second mapping when the robot system 110 includes more links 112. Here, the robot system 110 is defined in the world coordinate system 250, and the link 410 is defined in the link coordinate system 252. In this example, the orientation 330 may be determined according to the procedure shown at block 310 of FIG. 3. The positon of the link 410 may be determined based on the height H of the link 410 and the width W of the link 410.

Based on a geometry relationship as shown in FIG. 4, the second mapping $T_{linkN}^{world}$ between the link coordinate system 252 and the world coordinate system 250 may be determined. For example, trigonometric functions based on the width W, the height H and the orientation 330 may be used to determine the transformation matrix $T_{linkN}^{world}$ and details will be omitted hereinafter.

Figure 5:
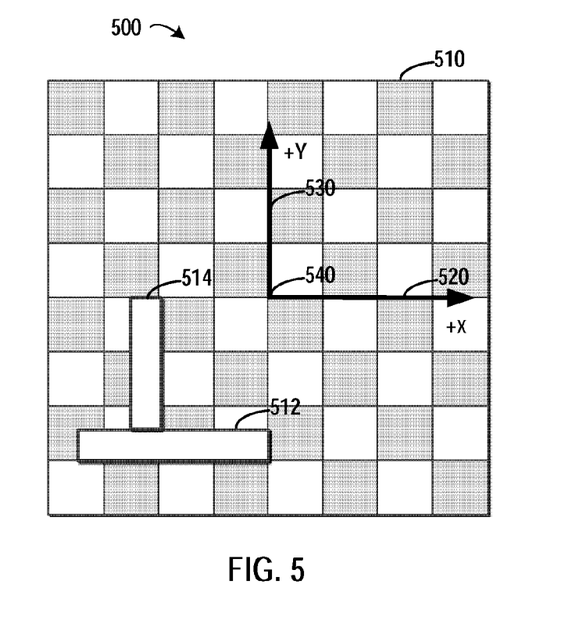
FIG. 5 illustrates a schematic diagram for calibrating a vision device based on a calibration board in accordance with embodiments of the present disclosure.

In some embodiments, the vision device 114 may be calibrated with a calibration board of the vision device 114 before the obtaining the at least one image. Details will be provided with reference to FIG. 5, which illustrates a schematic diagram 500 for calibrating the vision device 114 based on a calibration board 510 in accordance with embodiments of the present disclosure. As shown in FIG. 5, the calibration board 510 may be utilized for calibrating the vision device 114. The calibration board 510 may be a board printed with grids and reference marks 512 and 514. Here, the reference 512 and 514 may be used to determine the directions x and y in the vision coordinate system 254. In this embodiment of the present disclosure, the vision device 114 may be calibrated according to a traditional solution, and thus a mapping between the pixels in the images taken by the vision device 114 and corresponding points in the calibration board 510 may be defined. Accordingly, an x axis 520, a y axis 530, and an original point 540 in the vision coordinate system 254 may be determined during the calibrating procedure.

With these embodiments, the vision device 114 may be calibrated with the calibration board 510, therefore the further processing in the present disclosure may be performed on an accurate base. Moreover, the subsequent procedure for determining the mappings between various coordinate systems and for controlling the robot system 110 may be implemented in a precious way.

Figure 6:
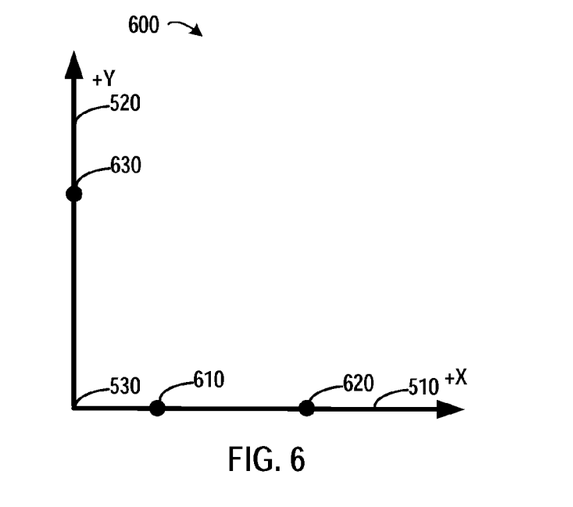
FIG. 6 illustrates a schematic diagram for determining a mapping between a vision coordinate system and a world coordinate system based on points selected in an image captured by a vision device in accordance with embodiments of the present disclosure.

In some embodiments, the third mapping may be determined based on the image obtained at block 320. Now example embodiments for determining the third mapping $T_{vision}^{world}$ will be described with reference to FIG. 6. FIG. 6 illustrates a schematic diagram 600 for determining a third mapping between the vision coordinate system 254 and the world coordinate system 250 based on points selected in an image captured by the vision device 114 in accordance with embodiments of the present disclosure. As shown in FIG. 6, a first point 610 and a second point 620 may be selected from the x axis 510 in the image. Here, a tool with a tip may be connected to the link 112 for selecting the first point 610 and the second point 620. A third point 630 in the y axis 520 in the image may be also selected with the tip. In this example, the image may be an image of the calibration board or another object that is placed under the vision device 114.

As shown in FIG. 6, three coordinates in the vision coordinate system 254 may be measured from the three points 610, 620 and 630 in image, respectively. In some embodiments, each of the three coordinates may include six freedom degrees: (x, y, z, α, β, γ), where three degrees such as (x, y, z) for indicating the positions; and three degrees such as (α, β, γ) for indicating the orientations. Further, three coordinates of the three points 610, 620 and 630 in the world coordinate system 250 may be read from the robot system 110, and the read coordinates may also be represented as (x, y, z, α, β, γ). Based on the above values of coordinates in the vison coordinate system 254 and the world coordinate system 250, the third mapping $T_{vision}^{world}$ may be determined.

With these embodiments, the above three points may be selected from the image taken by the vision device 112. As the coordinates of the three points in the vision coordinate system 254 may be measured from the image, and the coordinates of the three points in the world coordinate system 250 may be read from the robot system 110, the third mapping may be determined in an automatic manner without manual intervention. Based on the second mapping and the third mapping, the first mapping may be determined according to the above Equation (1).

4.2. Example Implementation II

The above paragraphs have described some embodiments for determining the first mapping based on one group of orientations and one image. Hereinafter, other embodiments for determining the first mapping based on two groups of orientations and two images will be described.

In some embodiments, in order to obtain the orientations for the links, the links 112 may be arranged in a first and a second posture, respectively. When the links are arranged in the first posture, a first group of orientations of the links and a first image of the object 220 may be obtained for the links 112. Further, when the links are arranged in the second posture, a second group of orientations of the links and a second image of the object 220 may be obtained. Here, when the positions of the links 112 are changed from the first posture to the second posture, the position of the object 220 should remain unchanged.

In these embodiments, the first mapping may be determined based on the following Equation (2), which represents transformations between the world coordinate system 250 and the vision coordinate system 254:

$$F_{object}^{world} = T_{linkN}^{world} * T_{vision}^{linkN} * F_{object}^{vision} \quad (2)$$

In the above Equation (2), $F_{object}^{world}$ indicates a point in the object 220 represented by the world coordinate system 250, and $F_{object}^{vision}$ indicates the point in the object 220 represented by the vision coordinate system 254. In this embodiment, the first group of orientations may be used to determine $T_{linkN}^{world}$ associated with the first posture, and the first image may be used to determine $F_{object}^{vision}$. Therefore, the first mapping $T_{vision}^{linkN}$ can be determined accordingly. With these embodiments, a further way is provide for determining the first mapping by placing the links 112 of the robot system 110 into a first posture and a second posture. By collecting the orientations and the images associated with the first posture and the second posture, respectively, the first mapping may be determined in an automatic manner without any manual intervention.

In some embodiments, based on the above Equation (2), a transformation relationship may be constructed between the first mapping, the first and second groups of orientations and the first and second images, where the first mapping being an unknown variable in the transformation relationship. Continuing the above example, values determined from the first and second groups of orientations and the first and second images may replace corresponding variables in Equation (2) to obtain the following Equations (3) and (4):

$$F_{object1}^{world} = T_{linkN1}^{world} * T_{vision}^{linkN} * F_{object1}^{vision} \quad (3)$$

$$F_{object2}^{world} = T_{linkN2}^{world} * T_{vision}^{linkN} * F_{object2}^{vision} \quad (4)$$

Then, Equations (3) and (4) may be solved so as to determine the first mapping. In the above Equation (3), the value $T_{linkN1}^{world}$ may be determined from the first group of orientations, and the value $F_{object1}^{vision}$ may be determined from the first image. Similarly, in the above Equation (4), the value $T_{linkN2}^{world}$ may be determined from the second group of orientations, and the value $F_{object2}^{vision}$ may be determined from the second image. Further, due to the face that $F_{object1}^{world}$ and $F_{object2}^{world}$ are constant, Equation (5) may be derived from Equations (3) and (4):

$$(T_{linkN2}^{world})^{-1} * T_{linkN1}^{world} * T_{vision}^{linkN} = T_{vision}^{linkN} * F_{object2}^{vision} * (F_{object1}^{vision})^{-1} \quad (5)$$

In the above Equation (5), the first mapping $T_{vision}^{linkN}$ is an unknown value while all the other values in Equation (5) are known. By solving the above Equation (5), the first mapping $T_{vision}^{linkN}$ may be determined. With these embodiments, the first mapping may be easily determined by solving the transformation relationship which is constructed based on the measurements collected in the robot system in the real time. Here, the collected measurements may correctly reflect the association between the various coordinate systems, therefore the first mapping may be determined in an accurate and automatic manner without manual intervention.

5. Management of Robot System based on First Mapping

The above paragraphs have described how to determine the first mapping, once the first mapping is determined, the first mapping may be used to facilitate operations of the robot system 110. Specifically, the first mapping may be used to convert the points in a target object that is to be processed by the robot system 110 from the vision coordinate system 254 into the world coordinate system 250. Alternatively, the first mapping may be used to convert the points in command of the controller 120 for the robot system 110 from the world coordinate system 250 into the vision coordinate system 254. Further, the various coordinate systems may be converted into a uniformed one and thus the robot system 110 may be assisted to perform the desired operation.

In some embodiments, an image of a target object to be processed by the robot system 110 may be obtained from the vision device 114. A source coordinate of the target object may be determined from the obtained image, here the source coordinate is represented in the vision coordinate system 254 and it may be directed measured by the vision device 114. Further, based on the source coordinate and the first mappings, a destination coordinate of the target object may be determined. In this example, the destination coordinate is represented in the world coordinate system 250, and it may be determined based on the above Equation (2). Further, the target object may be processed based on the destination coordinate.

In one example, if the tool 210 connected to the link 112, and it is desired to drill a hole at the center of the target object by the tool 210. First, size and position information about the target object may be obtained from an image taken by the vision device 114. The information may be converted from the vision coordinate system 254 into the world coordinate system 250 so as to assist the controller 120 to determine a movement path of the link 114. Then, the movement path may lead the tool 210 to the center of the target object and drill a hole there. With these embodiments, coordinates of the target object may be easily converted between the vision coordinate system 254 and the world coordinate system 250 during the subsequent operation of the robot system 110.

6. Example Apparatus and System

Figure 7:
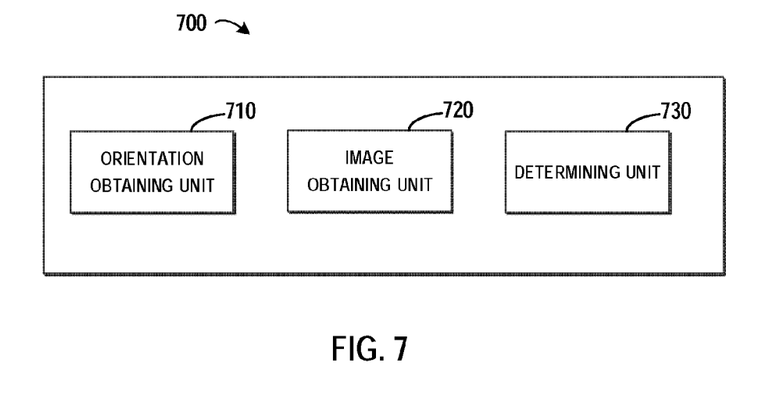
FIG. 7 illustrates a schematic diagram of an apparatus for managing a robot system in accordance with embodiments of the present disclosure.

In some embodiments of the present disclosure, an apparatus 700 for managing a robot system 110 is provided. FIG. 7 illustrates a schematic diagram of the apparatus 700 for managing a robot system 110 in accordance with embodiments of the present disclosure. As illustrated in FIG. 7, the apparatus 700 may comprise: an orientation obtaining unit 710 configured to obtain orientations for links 112 in the robot system 110 when the links 112 are arranged in at least one posture, each of the orientations indicating a direction pointed by one of the links 112; an image obtaining unit 720 configured to obtain, from a vision device 114 equipped on one of the links 112, at least one image of an object 220 placed in the robot system 110; and a determining unit 730 configured to determine, based on the orientations and the at least one image, a first mapping between a vision coordinate system 254 of the vision device 114 and a link coordination system 252 of the link 112.

In some embodiments, the determining unit 730 comprises: a second mapping determining unit configured to determine, based on the orientations, a second mapping between the link coordinate system 252 and a world coordinate system 250 of the robot system 110; a third mapping determining unit configured to determine, based on the at least one image, a third mapping between the vision coordinate system 254 and the world coordinate system 250; and a first mapping determining unit configured to determine the first mapping based on a transformation relationship between the first, second and third mappings.

In some embodiments, the second mapping determining unit is further configured to: determine the second mapping based on the orientations and positions of the links 112.

In some embodiments, the third determining unit comprises: a measurement obtaining unit configured to: obtain a first measurement and a second measurement for a first point and a second point in an image of the at least one image respectively, the first and second points located in a first axis of the vision coordinate system 254; obtain a third measurement of a third point in the image, the third point located in a second axis of the vision coordinate system 254; and a mapping determining unit configured to determine the third mapping based on the obtained first, second and third measurements.

In some embodiments, the apparatus 700 further comprises a calibrating unit configured to calibrate the vision device 114 with a calibration board of the vision device 114 before the obtaining the at least one image.

In some embodiments, the orientation obtaining unit 710 is further configured to: obtain a first group of orientations for the links 112 when the group of links 112 are arranged in a first posture; and obtain a second group of orientations for the links 112 when the group of links 112 are arranged in a second posture; and the image obtaining unit is further configured to: obtain a first image when the links 112 are arranged in the first posture, and obtain a second image when the links 112 are arranged in the second posture.

In some embodiments, the determining unit 730 comprises: a constructing unit configured to construct a transformation relationship between the first mapping, the first and second groups of orientations and the first and second images, the first mapping being an unknown variable in the transformation relationship; and a solving unit configured to solve the transformation relationship so as to determine the first mapping.

In some embodiments, the image obtaining unit 720 further configured to obtain, from the vision device 114, an image of a target object to be processed by the robot system 110.

In some embodiments, the apparatus 700 further comprises: a source determining unit configured to determine a source coordinate of the target object in the obtained image, the source coordinate represented in the vision coordinate system; a destination determining unit configured to determine a destination coordinate of the target object based on the source coordinate and the first mappings, the destination coordinate represented in the world coordinate system 250; and a processing unit configured to process the target object based on the destination coordinate.

Figure 8:
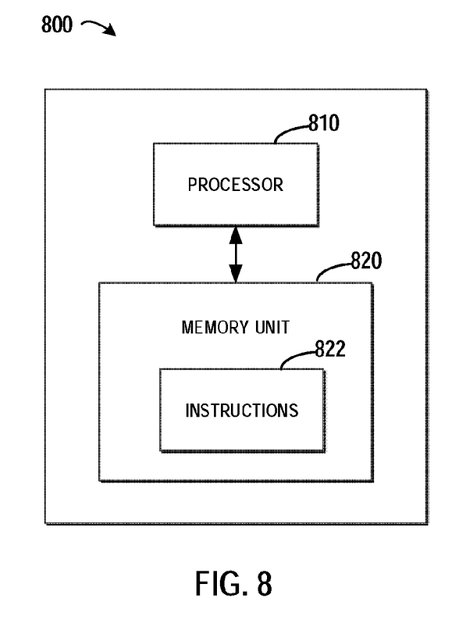
FIG. 8 illustrates a schematic diagram of a system for managing a robot system in accordance with embodiments of the present disclosure.

In some embodiments of the present disclosure, a system 800 for managing a robot system is provided. FIG. 8 illustrates a schematic diagram of the system 800 for managing a robot system 110 in accordance with embodiments of the present disclosure. As illustrated in FIG. 8, the system 800 may comprise a computer processor 810 coupled to a computer-readable memory unit 820, and the memory unit 820 comprises instructions 822. When executed by the computer processor 810, the instructions 822 may implement the method for managing a robot system as described in the preceding paragraphs, and details will be omitted hereinafter.

In some embodiments of the present disclosure, a computer readable medium for managing a robot system is provided. The computer readable medium has instructions stored thereon, and the instructions, when executed on at least one processor, may cause at least one processor to perform the method for managing a robot system as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a robot system, comprising:
   obtaining orientations for links in the robot system when the links are arranged in a first posture, each of the orientations indicating a direction pointed by one of the links;
   obtaining, from a vision device equipped on one of the links, at least one image of an object placed in the robot system; and
   determining, based on the orientations and the at least one image, a first mapping between a vision coordinate system of the vision device and a link coordinate system of the link;
   wherein the first posture includes any posture in the robot system;
   wherein the first posture is not limited to a fixed position.

2. The method of claim 1, wherein determining the first mapping comprises:
   determining, based on the orientations, a second mapping between the link coordinate system and a world coordinate system of the robot system;
   determining, based on the at least one image, a third mapping between the vision coordinate system and the world coordinate system; and
   determining the first mapping based on a transformation relationship between the second and third mappings.

3. The method of claim 2, wherein determining the second mapping further comprises:
   determining the second mapping based on positions of the links;
   wherein the positions of the links include a height and a width of the link.

4. The method of claim 2, wherein determining the third mapping comprises:
   obtaining a first measurement and a second measurement for a first point and a second point in an image of the at least one image respectively, the first and second points located in a first axis of the vision coordinate system;
   obtaining a third measurement of a third point in the image, the third point located in a second axis of the vision coordinate system; and
   determining the third mapping based on the obtained first, second and third measurements.

5. The method of claim 1, further comprising:
   calibrating the vision device with a calibration board of the vision device before the obtaining the at least one image.

6. The method of claim 1, wherein, obtaining the orientations for the links comprises:
   obtaining a first group of orientations for the links when the group of links are arranged in the first posture;
   obtaining a second group of orientations for the links when the group of links are arranged in a second posture; and
   obtaining the at least one image of the object comprises:
      obtaining a first image when the links are arranged in the first posture, and
      obtaining a second image when the links are arranged in the second posture.

7. The method of claim 6, wherein determining the first mapping comprises:
   constructing a transformation relationship between the first mapping, the first and second groups of orientations and the first and second images, the first mapping being an unknown variable in the transformation relationship; and
   solving the transformation relationship so as to determine the first mapping.

8. The method of claim 1, further comprising:
   obtaining, from the vision device, an image of a target object to be processed by the robot system;
   determining a source coordinate of the target object in the obtained image, the source coordinate represented in the vision coordinate system;
   determining a destination coordinate of the target object based on the source coordinate and the first mappings, the destination coordinate represented in a world coordinate system; and
   processing the target object based on the destination coordinate.

9. An apparatus for managing a robot system, comprising:
   an orientation obtaining unit configured to obtain orientations for links in the robot system when the links are arranged in a first posture, each of the orientations indicating a direction pointed by one of the links;

an image obtaining unit configured to obtain, from a vision device equipped on one of the links, at least one image of an object placed in the robot system; and a determining unit configured to determine, based on the orientations and the at least one image, a first mapping between a vision coordinate system of the vision device and a link coordination system of the link;

wherein the first posture includes any posture in the robot system;

wherein the first posture is not limited to a fixed position.

10. The apparatus of claim 9, wherein the determining unit comprises:

a second mapping determining unit configured to determine, based on the orientations, a second mapping between the link coordinate system and a world coordinate system of the robot system;

a third mapping determining unit configured to determine, based on the at least one image, a third mapping between the vision coordinate system and the world coordinate system; and a first mapping determining unit configured to determine the first mapping based on a transformation relationship between the second and third mappings.

11. The apparatus of claim 10, wherein the second mapping determining unit is further configured to:

determine the second mapping based on positions of the links;

wherein the positions of the links are based on a height and width of the link.

12. The apparatus of claim 10, wherein the third mapping determining unit comprises:

a measurement obtaining unit configured to:

obtain a first measurement and a second measurement for a first point and a second point in an image of the at least one image respectively, the first and second points located in a first axis of the vision coordinate system;

obtain a third measurement of a third point in the image, the third point located in a second axis of the vision coordinate system; and a mapping determining unit configured to determine the third mapping based on the obtained first, second and third measurements.

13. The apparatus of claim 9, further comprising:

a calibrating unit configured to calibrate the vision device with a calibration board of the vision device before the obtaining the at least one image.

14. The apparatus of claim 9, wherein, the orientation of obtaining unit is further configured to:

obtain a first group of orientations for the links when the group of links are arranged in the first posture, and obtain a second group of orientations for the links when the group of links are arranged in a second posture; and the image obtaining unit is further configured to:

obtain a first image when the links are arranged in the first posture, and obtain a second image when the links are arranged in the second posture.

15. The apparatus of claim 14, wherein the determining unit comprises:

a constructing unit configured to construct a transformation relationship between the first mapping, the first and second groups of orientations and the first and second images, the first mapping being an unknown variable in the transformation relationship; and a solving unit configured to solve the transformation relationship so as to determine the first mapping.

16. The apparatus of claim 9, wherein, the image obtaining unit further configured to obtain, from the vision device, an image of a target object to be processed by the robot system; and further comprising:

a source determining unit configured to determine a source coordinate of the target object in the obtained image, the source coordinate represented in the vision coordinate system;

a destination determining unit configured to determine a destination coordinate of the target object based on the source coordinate and the first mappings, the destination coordinate represented in a world coordinate system; and a processing unit configured to process the target object based on the destination coordinate.

17. A system for managing a robot system, comprising:

a computer processor coupled to a non-transitory computer-readable memory unit, the memory unit comprising instructions that when executed by the computer processor:

obtain orientations for links in the robot system when the links are arranged in a first posture, each of the orientations indicating a direction pointed by one of the links;

obtain from a vision device equipped on one of the links, at least one image of an object placed in the robot system; and determine based on the orientations and the at least one image, a first mapping between a vision coordinate system of the vision device and a link coordination system of the link;

wherein the first posture includes any posture in the robot system;

wherein the first posture is not limited to a fixed position.

18. A non-transitory computer readable medium having instructions stored thereon, the instructions, when executed on at least one processor, cause the at least one processor to:

obtain orientations for links in a robot system when the links are arranged in a first posture, each of the orientations indicating a direction pointed by one of the links;

obtain from a vision device equipped on one of the links, at least one image of an object placed in the robot system; and determine based on the orientations and the at least one image, a first mapping between a vision coordinate system of the vision device and a link coordination system of the link;

wherein the first posture includes any posture in the robot system;

wherein the first posture is not limited to a fixed position.

* * * * *